(12) United States Patent
Goldberg et al.

(10) Patent No.: US 10,813,048 B2
(45) Date of Patent: *Oct. 20, 2020

(54) SYNCHRONIZATION FOR EXTENDING BATTERY LIFE

(71) Applicant: InterDigital Technology Corporation, Wilmington, DE (US)

(72) Inventors: Steven Jeffrey Goldberg, Delray Beach, FL (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,099

(22) Filed: Jul. 15, 2019

(65) Prior Publication Data

US 2019/0342831 A1 Nov. 7, 2019

Related U.S. Application Data

(63) Continuation of application No. 15/670,695, filed on Aug. 7, 2017, now Pat. No. 10,356,718, which is a
(Continued)

(51) Int. Cl.
*H04B 1/16* (2006.01)
*H04W 52/02* (2009.01)
(Continued)

(52) U.S. Cl.
CPC ...... *H04W 52/0216* (2013.01); *H04B 1/1615* (2013.01); *H04W 52/0229* (2013.01);
(Continued)

(58) Field of Classification Search
CPC ..... H04B 7/2643; H04B 1/1615; H04W 7/04; H04W 72/0446; H04W 52/0216; H04W 56/001; H04W 52/0229; Y04B 60/50
(Continued)

(56) References Cited

U.S. PATENT DOCUMENTS

| 4,449,248 A | 5/1984 | Leslie et al. |
| 4,668,949 A | 5/1987 | Akahori et al. |

(Continued)

FOREIGN PATENT DOCUMENTS

| EP | 0 928 119 | 7/1999 |
| EP | 1 009 106 | 6/2000 |

(Continued)

OTHER PUBLICATIONS

ANSI/IEEE Std 802.11,1999 Edition, Information technology—Telecommunications and information exchange between systems—Local and metropolitan area networks—Specific requirements—Part 11: Wireless LAN Medium Access Control (MAC) and Physical Layer (PHY) Specifications, (Mar. 18, 1999).
(Continued)

*Primary Examiner* — Danh C Le
(74) *Attorney, Agent, or Firm* — Volpe and Koenig, P.C.

(57) ABSTRACT

A method performed by a WTRU may comprise receiving scheduling information on a broadcast control channel (BCCH) which defines time periods for reception of broadcast messages transmitted on a downlink shared channel. The WTRU may determine whether additional messages are available upon request. The availability of the additional messages is indicated via the BCCH. The WTRU may transmit a request for one or more of the additional messages.

20 Claims, 1 Drawing Sheet

Related U.S. Application Data continuation of application No. 14/104,497, filed on Dec. 12, 2013, now Pat. No. 9,730,158, which is a continuation of application No. 13/183,627, filed on Jul. 15, 2011, now Pat. No. 8,625,545, which is a continuation of application No. 10/428,566, filed on May 2, 2003, now Pat. No. 8,023,475.

(60) Provisional application No. 60/378,901, filed on May 6, 2002.

(51) Int. Cl.
　　　*H04W 56/00*　　(2009.01)
　　　*H04M 1/725*　　(2006.01)

(52) U.S. Cl.
　　　CPC ...... *H04W 56/001* (2013.01); *H04M 1/72519* (2013.01); *H04M 1/72522* (2013.01); *Y02D 70/40* (2018.01)

(58) Field of Classification Search
　　　USPC ................ 370/350, 347, 329, 337; 455/458
　　　See application file for complete search history.

(56) References Cited

U.S. PATENT DOCUMENTS

| | | | |
|---|---|---|---|
| 4,763,322 A | 8/1988 | Eizenhofer | |
| 5,128,665 A | 7/1992 | DeLuca et al. | |
| 5,278,831 A | 1/1994 | Mabey et al. | |
| 5,303,379 A | 4/1994 | Khoyi et al. | |
| 5,428,766 A | 6/1995 | Seaman | |
| 5,444,672 A | 8/1995 | Kushita | |
| 5,471,655 A | 11/1995 | Kivari | |
| 5,475,374 A | 12/1995 | Moore | |
| 5,509,015 A | 4/1996 | Tiedemann et al. | |
| 5,511,110 A | 4/1996 | Drucker | |
| 5,566,357 A | 10/1996 | Holcman | |
| 5,579,372 A | 11/1996 | Astrom | |
| 5,581,804 A | 12/1996 | Cameron et al. | |
| 5,584,048 A | 12/1996 | Wieczorek | |
| 5,590,396 A | 12/1996 | Henry | |
| 5,596,318 A | 1/1997 | Mitchell | |
| 5,625,882 A | 4/1997 | Vook et al. | |
| 5,629,940 A | 5/1997 | Gaskill | |
| 5,729,544 A | 3/1998 | Lev et al. | |
| 5,822,689 A | 10/1998 | Hwang | |
| 5,857,146 A | 1/1999 | Kido | |
| 5,881,055 A | 3/1999 | Kondo | |
| 5,905,443 A | 5/1999 | Olds et al. | |
| 5,918,170 A | 6/1999 | Oksanen et al. | |
| 5,923,649 A | 7/1999 | Raith | |
| 5,946,629 A | 8/1999 | Sawyer et al. | |
| 6,034,949 A | 3/2000 | Gellhaus et al. | |
| 6,044,069 A * | 3/2000 | Wan | H04W 52/0216 370/311 |
| 6,072,784 A | 6/2000 | Agrawal et al. | |
| 6,097,704 A | 8/2000 | Jackson et al. | |
| 6,108,542 A * | 8/2000 | Swanchara | H04W 52/0229 455/434 |
| 6,138,002 A * | 10/2000 | Alperovich | H04M 15/28 455/407 |
| 6,144,656 A | 11/2000 | Kinnunen et al. | |
| 6,154,642 A | 11/2000 | Dumont et al. | |
| 6,195,573 B1 | 2/2001 | Cassidy et al. | |
| 6,198,913 B1 | 3/2001 | Sung et al. | |
| 6,212,221 B1 | 4/2001 | Wakayama et al. | |
| 6,215,778 B1 | 4/2001 | Lomp et al. | |
| 6,246,867 B1 | 6/2001 | Jakobsson | |
| 6,256,509 B1 | 7/2001 | Tanaka | |
| 6,275,487 B1 | 8/2001 | Szalajski et al. | |
| 6,278,887 B1 | 8/2001 | Son et al. | |
| 6,282,183 B1 | 8/2001 | Harris et al. | |
| 6,289,464 B1 | 9/2001 | Wecker et al. | |
| 6,308,068 B1 | 10/2001 | Kunkel | |
| 6,310,558 B1 | 10/2001 | Minami | |
| 6,330,234 B1 | 12/2001 | Tomasi et al. | |
| 6,333,939 B1 | 12/2001 | Butler et al. | |
| 6,335,922 B1 | 1/2002 | Tiedemann, Jr. et al. | |
| 6,356,595 B1 | 3/2002 | Czaja et al. | |
| 6,366,572 B1 | 4/2002 | Esterberg et al. | |
| 6,438,375 B1 | 8/2002 | Muller | |
| 6,452,644 B1 | 9/2002 | Shimakawa | |
| 6,463,307 B1 | 10/2002 | Larsson et al. | |
| 6,473,607 B1 | 10/2002 | Shohara et al. | |
| 6,477,151 B1 | 11/2002 | Oksala | |
| 6,477,382 B1 | 11/2002 | Mansfield et al. | |
| 6,480,476 B1 | 11/2002 | Willars | |
| 6,480,504 B1 | 11/2002 | Wang et al. | |
| 6,519,234 B1 | 2/2003 | Werkander | |
| 6,522,873 B1 | 2/2003 | Moles et al. | |
| 6,532,220 B1 | 3/2003 | Carneal et al. | |
| 6,577,617 B1 | 6/2003 | Ue et al. | |
| 6,594,499 B1 | 7/2003 | Andersson et al. | |
| 6,606,502 B1 | 8/2003 | Chung Kam Chung et al. | |
| 6,618,256 B1 | 9/2003 | Bovio et al. | |
| 6,622,251 B1 | 9/2003 | Lindskog et al. | |
| 6,636,496 B1 | 10/2003 | Cho et al. | |
| 6,636,745 B2 | 10/2003 | Oprescu-Surcobe et al. | |
| 6,650,912 B1 | 11/2003 | Chen et al. | |
| 6,665,520 B2 | 12/2003 | Romans | |
| 6,665,722 B1 | 12/2003 | Elliott | |
| 6,725,068 B2 | 4/2004 | Higuchi | |
| 6,728,300 B1 | 4/2004 | Sarkar et al. | |
| 6,728,550 B1 | 4/2004 | Bohnke | |
| 6,775,259 B1 | 8/2004 | Ranta | |
| 6,785,258 B1 | 8/2004 | Garcia, Jr. et al. | |
| 6,807,427 B1 | 10/2004 | Sakamoto et al. | |
| 6,823,191 B2 | 11/2004 | Laroia et al. | |
| 6,826,408 B1 | 11/2004 | Kim et al. | |
| 6,831,909 B1 | 12/2004 | Koo et al. | |
| 6,879,579 B1 | 4/2005 | Myles et al. | |
| 6,961,571 B1 | 11/2005 | Rune et al. | |
| 6,973,566 B2 * | 12/2005 | Smith | G06F 21/55 380/271 |
| 7,085,248 B1 * | 8/2006 | Holma | H04B 17/336 370/329 |
| 7,096,353 B2 * | 8/2006 | Smith | H04L 63/04 380/266 |
| 7,099,659 B1 | 8/2006 | Schnake et al. | |
| 7,126,926 B1 | 10/2006 | Bjorklund et al. | |
| 7,142,526 B1 | 11/2006 | Hokao | |
| 7,187,665 B2 | 3/2007 | Nakamura | |
| 7,197,020 B2 | 3/2007 | Saito | |
| 7,197,768 B2 * | 3/2007 | Cole | H04L 63/04 380/266 |
| 7,203,184 B2 | 4/2007 | Ido et al. | |
| 7,206,933 B2 * | 4/2007 | Strongin | G06F 21/85 380/266 |
| 7,218,663 B1 | 5/2007 | Yokota et al. | |
| 7,277,737 B1 | 10/2007 | Vollmer et al. | |
| 7,305,012 B1 | 12/2007 | DeAngeli et al. | |
| 7,325,250 B1 * | 1/2008 | Barclay | H04W 12/08 380/247 |
| 7,366,536 B2 | 4/2008 | Hayashi et al. | |
| 7,379,430 B2 | 5/2008 | Duplessis | |
| 7,383,432 B1 * | 6/2008 | Barnes | G06F 21/55 713/151 |
| 7,463,608 B2 | 12/2008 | Bolgiano et al. | |
| 2002/0022455 A1 | 2/2002 | Salokannel | |
| 2002/0037736 A1 | 3/2002 | Kawaguchi | |
| 2002/0037749 A1 | 3/2002 | Wager | |
| 2002/0041576 A1 | 4/2002 | Chang et al. | |
| 2002/0049732 A1 * | 4/2002 | Matsumura | H04N 5/44543 |
| 2002/0090959 A1 | 7/2002 | Laroia et al. | |
| 2002/0090960 A1 | 7/2002 | Laroia et al. | |
| 2002/0107932 A1 | 8/2002 | Haury | |
| 2002/0141331 A1 | 10/2002 | Mate et al. | |
| 2002/0187789 A1 | 12/2002 | Diachina et al. | |
| 2003/0002472 A1 | 1/2003 | Choi et al. | |
| 2003/0002518 A1 | 1/2003 | Shibutani | |
| 2003/0005279 A1 | 1/2003 | Valenci et al. | |
| 2003/0018726 A1 | 1/2003 | Low et al. | |
| 2003/0032462 A1 | 2/2003 | Wang et al. | |

(56) References Cited

U.S. PATENT DOCUMENTS

| | | |
|---|---|---|
| 2003/0078000 A1 | 4/2003 | Tatsumi et al. |
| 2003/0123492 A1 | 7/2003 | Locke |
| 2003/0214937 A1 | 11/2003 | Lindoff et al. |
| 2003/0223394 A1 | 12/2003 | Parantainen et al. |
| 2003/0235161 A1 | 12/2003 | Shoji et al. |
| 2003/0235169 A1 | 12/2003 | Pandey et al. |
| 2005/0171811 A1 | 8/2005 | Campbell et al. |
| 2010/0002852 A1 | 1/2010 | Schmidt et al. |

FOREIGN PATENT DOCUMENTS

| | | |
|---|---|---|
| EP | 1 065 626 | 1/2001 |
| EP | 0 864 241 | 4/2002 |
| EP | 0 801 876 | 11/2003 |
| JP | 63-199526 | 8/1988 |
| JP | 01-170129 | 7/1989 |
| JP | 02-079526 | 3/1990 |
| JP | 03-065830 | 3/1991 |
| JP | 03-268626 | 11/1991 |
| JP | 05-075528 | 3/1993 |
| JP | 05-114883 | 5/1993 |
| JP | 05-199150 | 8/1993 |
| JP | 05-308317 | 11/1993 |
| JP | 08-033008 | 2/1996 |
| JP | 08-056381 | 2/1996 |
| JP | 2000-253448 | 9/2000 |
| JP | 2000-261364 | 9/2000 |
| JP | 2000-261840 | 9/2000 |
| JP | 2001-036457 | 2/2001 |
| JP | 2002-064589 | 2/2002 |
| JP | 2002-094443 | 3/2002 |
| WO | 91/03037 | 3/1991 |
| WO | 91/11868 | 8/1991 |
| WO | 97/15154 | 4/1997 |
| WO | 99/21111 | 4/1999 |
| WO | 99/22352 | 5/1999 |
| WO | 99/27696 | 6/1999 |
| WO | 00/45281 | 8/2000 |
| WO | 00/69209 | 11/2000 |
| WO | 01/22606 | 3/2001 |
| WO | 01/33870 | 5/2001 |
| WO | 01/97538 | 12/2001 |
| WO | 02/33989 | 5/2002 |

OTHER PUBLICATIONS

European Telecommunication Standard, "Paging Systems (PS); European Radio Message System (ERMES); Part 4: Air interface specification," Jul. 1992, pp. 1-39.

Holma et al., "WCDMA for UMTS: Radio Access for Third Generation Mobile Communications," Revised Edition, Wiley, (Apr. 12, 2001).

IEEE Standard for Local and metropolitan area networks, Part 16: Air Interface for Fixed Broadband Wireless Access Systems, IEEE Std. 802.16-2001 (Apr. 8, 2002).

IEEE Std 802.16a-2003, IEEE Standard for Local and metropolitan area networks, Part 16: Air Interface for Fixed Broadband Wireless Access Systems—Amendment 2: Medium Access Control Modifications and Additional Physical Layer Specifications for 2-11 GHz, Apr. 1, 2013.

Sedgewick, "Algorithms in C: Part 5: Graph Algorithms," XP0015377 (2002).

Third Generation Partnership Project, "Technical Specification Group Radio Access Network; UE Procedures in Idle Mode and Procedures for Cell Reselection in Connected Mode (Release 1999)," 3GPP TS 25.304 V3.12.0 (Dec. 2002).

Third Generation Partnership Project, "Technical Specification Group Radio Access Network; UE Procedures in Idle Mode and Procedures for Cell Reselection in Connected Mode (Release 4)," 3GPP TS 25.304 V4.4.0 (Mar. 2002).

Third Generation Partnership Project, "Technical Specification Group Radio Access Network; UE Procedures in Idle Mode and Procedures for Cell Reselection in Connected Mode (Release 4)," 3GPP TS 25.304 V4.6.0 (Dec. 2002).

Third Generation Partnership Project, "Technical Specification Group Radio Access Network; UE Procedures in Idle Mode and Procedures for Cell Reselection in Connected Mode (Release 5)," 3GPP TS 25.304 V5.0.0 (Mar. 2002).

Third Generation Partnership Project, "Technical Specification Group Radio Access Network; UE Procedures in Idle Mode and Procedures for Cell Reselection in Connected Mode (Release 5)," 3GPP TS 25.304 V5.2.0 (Dec. 2002).

Third Generation Partnership Project; Technical Specification Group Radio Access Network; UE Procedures in Idle Mode and Procedures for Cell Reselection in Connected Mode (Release 1999), 3GPP TS 25.304 V3.10.0 (Mar. 2002).

* cited by examiner

SYNCHRONIZATION FOR EXTENDING BATTERY LIFE

CROSS REFERENCE TO RELATED APPLICATIONS

This application is a continuation of U.S. patent application Ser. No. 15/670,695, filed on Aug. 7, 2017, which is a continuation of U.S. patent application Ser. No. 14/104,497, filed Dec. 12, 2013, which issued as U.S. Pat. No. 9,730,158 on Aug. 8, 2017, which is a continuation of U.S. patent application Ser. No. 13/183,627, filed Jul. 15, 2011, which issued as U.S. Pat. No. 8,625,545 on Jan. 7, 2014, which is a continuation of U.S. patent application Ser. No. 10/428,566, filed May 2, 2003, which issued as U.S. Pat. No. 8,023,475 on Sep. 20, 2011, which claims priority from U.S. Provisional Application No. 60/378,901, filed on May 6, 2002, the contents of which are hereby incorporated by reference herein.

FIELD OF INVENTION

The field of invention relates to wireless communications. More specifically, the field of invention relates to the optimization of power resources of wireless devices within wireless communications systems.

BACKGROUND

The more often a battery operated device, such as a wireless transmit/receive unit (WTRU), looks for possible data being sent to it, the more power the device consumes. In networks and devices that support not only telephony, but also data transmission, the manner in which the devices look for messages from the network varies, depending on whether the device is looking for incoming phone calls or incoming data transmissions.

With respect to telephony, users are accustomed to terrestrial networks wherein a ringing sound is heard almost immediately after a particular telephone number is dialed. To meet this expectation in wireless environments, a WTRU must frequently scan the network to minimize the delay in establishing a connection as perceived by a person placing a phone call. That is, the WTRU must frequently scan the network for incoming calls to minimize the time between when the network sends a calling signal or message and when the receiving WTRU actually checks for the calling signal.

This arrangement is quite suitable for telephony, but is inefficient for data transmission. With respect to data transmission, the strict requirements necessary for ensuring a near-instantaneous response to a call are not required. Longer delays are generally tolerated when transmitting data to WTRUs such as pagers and similar devices, for example. However, it is generally expected, that such devices respond to a message indicating that there is an incoming data transmission "in real time." Therefore, the network must also be scanned rather frequently in some cases when dealing with data transmission, but even in such situations the frequency with which the network must be scanned is less then when dealing with telephony.

The amount of delay that is acceptable varies according to the type of data being transmitted and user preference. For example, longer delays are tolerated where information is infrequently updated, such as traffic or weather data. In the case of a pager, a reasonable response time could be evaluated in terms of an anticipated time delay for the user to respond to a paged message. In the case of multiple network transmissions (i.e. stock quotes, sport scores, etc.), some users want information occasionally updated so that they may have longer battery life. Other users have less concern for battery life and simply want data updated rapidly. Examples of users wishing frequent updates would be people desiring immediate information updates and people whose WTRU is connected to an external power supply. In the case of stock quotes, for example, there are casual watchers, and those who desire immediate notification of changes. Thus, if the user would expect to respond to a message quickly, the response time should ideally be fairly quick, but still much greater than the necessary response time for a WTRU becoming aware of an incoming telephone call.

It would therefore be desirable to have a method and system for efficiently supporting data transmissions as well as telephony.

SUMMARY

A wireless network permits WTRUs to operate in a quiescent mode of operation according to a synchronization schedule. Synchronization information is provided to the WTRUs to inform them of when they may be in a quiescent mode and when they need to wake up and retrieve data.

A method performed by a WTRU may comprise receiving scheduling information on a broadcast control channel (BCCH) which defines time periods for reception of broadcast messages transmitted on a downlink shared channel. The WTRU may determine whether additional messages are available upon request. The availability of the additional messages is indicated via the BCCH. The WTRU may transmit a request for one or more of the additional messages.

DETAILED DESCRIPTION OF THE PREFERRED EMBODIMENTS

According to an embodiment, synchronization information is provided to wireless transmit/receive units (WTRUs) to inform them of when they may be in a quiescent mode (i.e. when they may be asleep) and when they need to wake up and retrieve data. For purposes of describing the invention, a WTRU may have a transmit-only, a receive-only or a transmit-and-receive capability. That is, a WTRU may be any type of device capable of receiving and/or transmitting data in a wireless environment.

Figure 1:
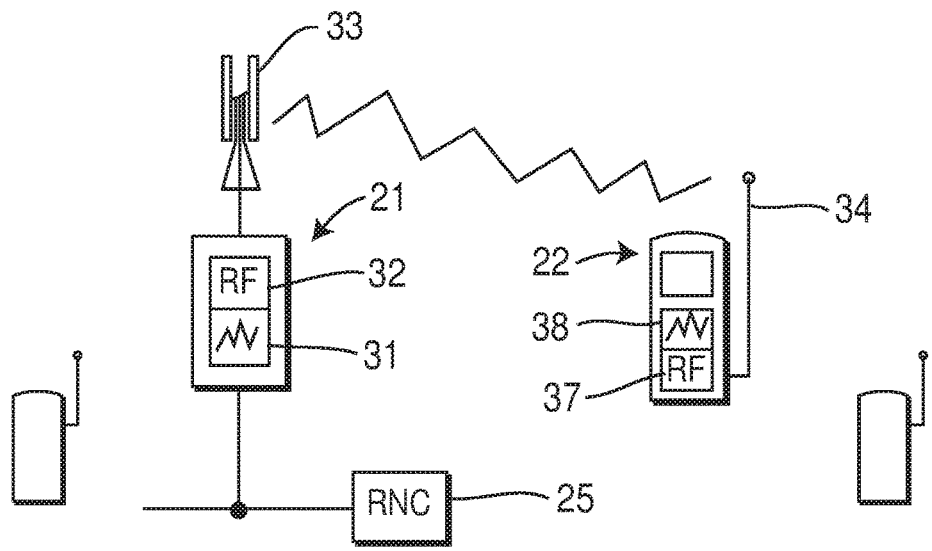
FIG. 1 is diagram showing a wireless communication network.

Referring now to FIG. 1, a representation of a network is shown wherein one or more base stations 21 communicate with a plurality of WTRUs, such as WTRU 22 which will be referred to when describing the invention. The WTRU 22, as explained, can be any of a number of devices supported by the network. Examples include user equipment (UE), cellphone, pager, Blackberry™ device, computer with a modem connection or any other device that is capable of operating in a wireless environment. The base station 21 is controlled by a radio network controller (RNC) 25 which performs various network supervisory and communications functions. The base station 21 includes signal processing circuitry 31 and an RF stage 32, which includes a transmit function. Signals from the base station 21 are transmitted to the WTRUs within its cell or transmission area, as represented by antennas 33, 34. The WTRU 22 has an RF stage 37 and a signal processing stage 38. A receive function is provided by the WTRU's RF stage 37 in order to receive signals transmitted by the base station 21. In the case of two-way devices, the RF stages 32 and 37 have both transmit and receive functions, permitting the WTRU 22 to transmit data in an uplink and receive data in a downlink. While transmitting requires significantly greater power than receiving, issues of quiescent operation primarily affect the downlink, so the receiver function of the WTRU 22 is significant.

In accordance with an embodiment, the WTRU 22 uses its signal processing circuitry 38 in order to control when the RF stage 37 is receiving signals from the base station 21. This allows the operation of the receive function of the WTRU 22 to be active primarily during times when signals are expected to include data intended for that particular WTRU 22. During at least some of the time when signals are not intended for that particular WTRU 22, the WTRU goes quiescent, meaning that most reception and signal processing by the WTRU 22 is turned off.

Regardless of the manner in which data is being transmitted from the network, the WTRUs are preferably synchronized so that they may wake up and go sleep to maximize battery life and satisfy user preferences. The synchronization information provided to the WTRUs is provided in accordance with the manner in which data is being delivered from the network. That is, regardless of the manner in which data is being transmitted from the network, synchronization information is provided to WTRUs so that they are aware of when they need to be awake and when they may go to sleep.

As known to those skilled in the art, data may be provided from the network to WTRUs in a variety of ways, as desired. In one embodiment, data may be transmitted in the form of scheduled transmissions. In this case, the network transmits various types of broadcast or multicast data on a known schedule that is tightly synchronized to a time frame known by both the transmitting WTRU and the receiving WTRU(s). The WTRUs can then synchronize their wake-ups to search occurrences when data may or will be transmitted. To implement this embodiment in $3^{rd}$ generation cellular networks, scheduling information can either be provided by a common control channel such as the Broadcast Common Control Channel (BCCH) signaling or a Dedicated Control Channel (DCCH) signaling. Where BCCH signaling is used, scheduling (i.e. synchronization) information may be signaled for all broadcast and multicast services. If DCCH signaling is used, only scheduling of services that are specific to a receiving WTRU will be signaled.

In another embodiment, data may be transmitted in the form of multiple network transmissions. That is, as mentioned, some users want information updated only occasionally in favor of longer battery life whereas others want data updated rapidly without regard for battery life. Therefore, in this embodiment, data is transmitted (even where there is no data change) at a rate that is consistent with a user's preference for the frequency of updates versus battery life. By transmitting data at a rapid by synchronized pace (i.e. the highest available rate desired by a user) and repeating the transmissions even when there is no data change, individual receiving WTRUs can wake up and search for data at different time intervals, according to user preference. This satisfies the needs of both groups of users (as well as those in between) by providing an adjustable degree of settings.

Since the amount of delay that is acceptable varies according to the particular user application, it is likely that any tradeoff between delay and power consumption would have different optimums for different users. Therefore latency (i.e. delay time) may be optimized based on usage, as low latency conflicts with low power consumption. This becomes particularly significant during times when the WTRU is not in active use.

To implement this embodiment in $3^{rd}$ generation cellular networks, once a receiving WTRU is aware of scheduled broadcast or multicast transmissions, the receiving WTRU can then acquire the service (i.e. the scheduled broadcast or multicast transmissions) transmitted on either the Forward Access Channel (FACH) or the Downlink Shared Channel (DSCH) on an as needed basis. The network will transmit the broadcast or multicast data in either Radio Link Control Transparent or Unacknowledged Mode, which allows the receiving WTRU to determine if reception is needed autonomously without requiring interaction or causing errors to be perceived in the network.

A modification to the embodiment where multiple network transmissions are provided is to transmit only until certain WTRUs in the network's range acknowledge receipt. This modification has the advantage of terminating the transmission when it is no longer necessary while also providing some robustness to the transmission of the information for appropriately enabled devices. This modification has the disadvantage of requiring uplink transmissions from WTRUs and may not be suitable for a large number of WTRUs. With respect to implementation in $3^{rd}$ generation cellular networks, there are several network acknowledgement alternatives. For example, where there is a single receiving WTRU, Radio Link Control Acknowledged mode provides an automatic repeat request mechanism for assured delivery. When there are multiple receiving WTRUs, layer 3 acknowledgements can either by provided by Radio Resource Control signaling within the Access Stratum, or by transparent data transfer of Non Access Stratum signaling.

In another embodiment, the network simply transmits the fact that there is a message awaiting delivery. That is, rather then sending the message all the time, in some instances it is more efficient to just notify the WTRUs that a message for them exists. In $3^{rd}$ generation cellular networks the availability of the message is identified by a common control channel, such as the BCCH. Those WTRUs that want the message will then request its transmission from the network. The request for the message may either be for the particular message or registration with the multicast service for reception of one or more messages associated with that service. This approach is suitable when only a small number of WTRUs are expected to request the actual message, while many WTRUs may want the actual ability to do so. This situation may arise, for example, where there is only limited information in the initial transmission informing WTRUs of a message's existence. In $3^{rd}$ generation cellular networks, the receiving WTRU will generate a request for the service with either layer Access Stratum or Non Access Stratum signaling. The network will then either signal broadcast scheduling information or establish a dedicated radio bearer for transmission of the service. That is, the network with knowledge of the number of WTRUs requesting the message or service of multiple messages determines the most efficient method of transmission. If there is a large number of recipients, scheduling of information will be signaled on a common control channel. This information will identify a common channel such as the FACH or DSCH, and the time of transmission for reception of the service. If there is a small number of WTRUs requesting the message or service a dedicated channel will be established to each requesting or registered WTRU associated with this message or service.

Figure 2:
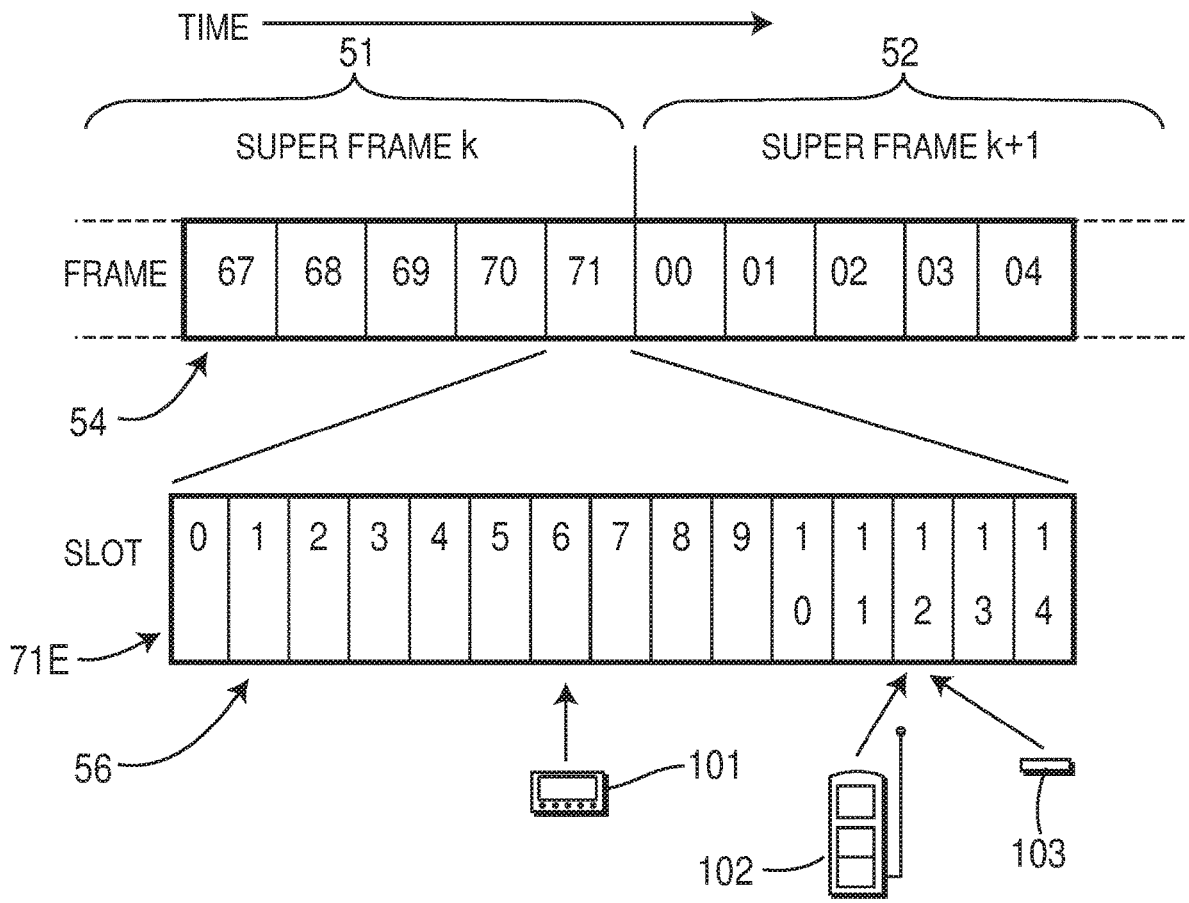
FIG. 2 is a data diagram showing a frame structure used in an embodiment.

Referring now to FIG. 2, a signal frame diagram including a sequence of transmissions transmitted by a base station to multiple WTRUs is shown. As mentioned, the delivery of transmissions is synchronized so that messages directed to a particular WTRU or group of WTRUs associated with that message or service is delivered when that particular WTRU or group of WTRUs associated with that message or service is awake looking for data. To accomplish this, in one embodiment, the transmissions are divided into frames 54 wherein seventy two (72) frames 54 make up a superframe, as shown in FIG. 2. For simplicity in describing the invention, portions of two superframes 51, 52 are shown. It should be noted, however, that superframes 51, 52 are part of a repeating series of superframes, each having seventy two (72) frames. It should also be noted that a superframe having 72 frames is provided purely by way of example, as other multiframe sequences are possible.

The frames 54 are divided into time slots 56, as shown in an expanded view 71E of frame 71. The time slots 56 within each frame, such as frame 71, include transmission packets designated, for example, zero (0) through (14). Each time slot 56 may include data intended for one or more devices. By way of example, slot 6 includes data for WTRU 101 and slot 12 includes data for WTRUs 102 and 103.

WTRUs 101 through 103 preferably synchronize their reception so that they are able to receive data during their respective allocated time period. The use of fixed time periods for data reception means that, once a WTRU is provided with its synchronization information (i.e. information related to the particular time sequence of signals intended for that WTRU), the WTRU may synchronize with that time sequence and remain asleep (i.e. quiescent) for a portion of a superframe. This results in reduced power consumption because a WTRU in a quiescent state has most or all of its RF reception circuits turned off. The WTRU, preferably, has most of its signal processing circuits turned off as well. In this embodiment, the reduction in power consumption approximately corresponds to the number of frames that are ignored.

Once synchronized, WTRUs 101 through 103 wake up only in their respective slot, radio frame or multiframe associated with the particular interleaving period known as the transmission time interval (TTI). From the network perspective, for each superframe, the network will wait for frame 71, slot 6 before transmitting data to WTRU 101.

It should be noted that WTRUs may wake up at other times (i.e. other than their designated slots), if needed. For example, it may be necessary to wake up for certain common signals. Additionally, the network and WTRUs may be adapted so that a special "wake up" signal is transmitted from the network to a particular WTRU or group of WTRUs where it is necessary for the WTRU(s) to wake up and receive data outside of their designated slot.

It should be noted that the division of transmissions into superframes, frames, and slots may be varied as desired. For example, in the discussion above, it is assumed that a WTRU will wake up at least every superframe and look for data in at least one slot of at least one frame. However, as mentioned, data transmissions may be provided to users as desired so as to satisfy user preferences for battery life and frequency of data renewal. Therefore, the timing of a particular synchronization scheme may similarly be varied. By way of example, it is possible to create a synchronization schedule between network data delivery and a WTRU's receipt thereof wherein more than one superframe passes between WTRU wake up periods within which a WTRU wakes up and looks for a message at its assigned frame and slot.

While the present invention has been described in terms of the preferred embodiment, other variations which are within the scope of the invention as outlined in the claims below will be apparent to those skilled in the art.

What is claimed is:

1. A wireless transmit/receive unit (WTRU) comprising:
a receiver configured to receive scheduling information on a broadcast control channel (BCCH), wherein the scheduling information defines time periods for reception of broadcast messages transmitted on a downlink shared channel;
circuitry configured to determine whether additional messages are available upon request, wherein an availability of the additional messages is indicated via the BCCH; and
a transmitter configured to transmit a request for one or more of the additional messages.

2. The WTRU of claim 1, wherein the scheduling information is received subsequent to synchronization information.

3. The WTRU of claim 1, wherein the scheduling information is received at one or more fixed intervals.

4. The WTRU of claim 1, wherein each one of the time periods is at least one time slot in duration.

5. The WTRU of claim 1, further comprising:
the receiver configured to receive the one or more additional messages.

6. The WTRU of claim 5, wherein receipt of the one or more additional messages is unacknowledged by the WTRU.

7. The WTRU of claim 1, wherein the scheduling information is received from a base station.

8. The WTRU of claim 1, further comprising:
circuitry configured to enter a quiescent state;
the receiver configured to receive a wake up signal; and
in response to receipt of the wake up signal, the receiver configured to receive data outside of the time periods for reception.

9. A method performed by a wireless transmit/receive unit (WTRU), the method comprising:
receiving scheduling information on a broadcast control channel (BCCH), wherein the scheduling information defines time periods for reception of broadcast messages transmitted on a downlink shared channel;
determining whether additional messages are available upon request, wherein an availability of the additional messages is indicated via the BCCH; and
transmitting a request for one or more of the additional messages.

10. The method of claim 9, wherein the scheduling information is received subsequent to synchronization information.

11. The method of claim 9, wherein the scheduling information is received at one or more fixed intervals.

12. The method of claim 9, wherein each one of the time periods is at least one time slot in duration.

13. The method of claim 9, further comprising:
the receiver configured to receive the one or more additional messages.

14. The method of claim 13, wherein receipt of the one or more additional messages is unacknowledged by the WTRU.

15. The method of claim 9, wherein the scheduling information is received from a base station.

16. The method of claim 9, further comprising:
entering a quiescent state;
receiving a wake up signal; and
in response to receiving the wake up signal, receiving data outside of the time periods for reception.

17. A wireless transmit/receive unit (WTRU) comprising:
a receiver configured to receive scheduling information on a broadcast control channel (BCCH), wherein the scheduling information defines time periods for reception of broadcast messages transmitted on a downlink shared channel and contains resource configuration information that is common for a plurality of WTRUs;
circuitry configured to determine whether additional messages are available upon request, wherein an availability of the additional messages is indicated via the BCCH; and
a transmitter configured to transmit, on an access channel, a request for one or more of the additional messages.

18. The WTRU of claim 17, wherein the scheduling information is received subsequent to synchronization information.

19. The WTRU of claim 17, further comprising:
the receiver configured to receive the one or more additional messages.

20. The WTRU of claim 17, further comprising:
circuitry configured to enter the WTRU into a quiescent state;
the receiver configured to receive a wake up signal; and
in response to receipt of the wake up signal, the receiver configured to receive data outside of the time periods for reception.

* * * * *